United States Patent
Jeon et al.

(10) Patent No.: US 10,358,375 B2
(45) Date of Patent: Jul. 23, 2019

(54) SCRIBING WHEEL HAVING FINE STRUCTURE RECESS

(71) Applicant: EHWA DIAMOND INDUSTRIAL CO., LTD., Gyeonggi-do (KR)

(72) Inventors: Chang Ho Jeon, Seoul (KR); Sung Hee Lee, Pyeongtaek-si (KR); Sang Beom Kim, Yongin-si (KR); Taek Jung Shin, Seongnam-si (KR); Seh Kwang Lee, Yongin-si (KR); In Sub Kim, Osan-si (KR)

(73) Assignee: EHWA DIAMOND INDUSTRIAL CO., LTD., Osan-si, Gyeonggi-Do (KR)

( * ) Notice: Subject to any disclaimer, the term of this patent is extended or adjusted under 35 U.S.C. 154(b) by 616 days.

(21) Appl. No.: 14/417,165

(22) PCT Filed: Jul. 26, 2013

(86) PCT No.: PCT/KR2013/006751
§ 371 (c)(1),
(2) Date: Jan. 26, 2015

(87) PCT Pub. No.: WO2014/017878
PCT Pub. Date: Jan. 30, 2014

(65) Prior Publication Data
US 2015/0175470 A1    Jun. 25, 2015

(30) Foreign Application Priority Data
Jul. 27, 2012 (KR) .................. 10-2012-0082481

(51) Int. Cl.
*C03B 33/10* (2006.01)
*B26D 3/08* (2006.01)
(Continued)

(52) U.S. Cl.
CPC ............. *C03B 33/107* (2013.01); *B26D 3/08* (2013.01); *B26D 3/085* (2013.01); *B28D 1/225* (2013.01);
(Continued)

(58) Field of Classification Search
CPC ..... C03B 33/017; C03B 33/105; C03B 33/10; C03B 33/107; B26D 3/08; Y10T 83/0385;
(Continued)

(56) References Cited

U.S. PATENT DOCUMENTS

| | | | |
|---|---|---|---|
| 5,836,229 A | * 11/1998 | Wakayama | B24B 3/08 225/96 |
| 2009/0078105 A1 | * 3/2009 | Maekawa | B28D 1/225 83/886 |

(Continued)

FOREIGN PATENT DOCUMENTS

| | | | |
|---|---|---|---|
| CN | 101745990 A | * 6/2010 | ............. B28D 1/225 |
| CN | 101746948 A | 6/2010 | |

(Continued)

OTHER PUBLICATIONS

English Translation of CN101745990.*
(Continued)

*Primary Examiner* — Jennifer B Swinney
(74) *Attorney, Agent, or Firm* — John K. Park; Park Law firm

(57) ABSTRACT

Disclosed herein is a scribing wheel having a predetermined thickness and a disk shape. The scribing wheel includes: a wheel body configured in such a way that at least a peripheral edge portion thereof is gradually reduced in thickness from the center to the radial outside; and a cutter part including recesses and cutting blade teeth which are alternately arranged along the peripheral edge portion. Each recess is formed by a combination of side recess portions (Continued)

formed in opposite side surfaces of the peripheral edge portion of the wheel body and an edge recess portion formed in the peripheral edge of the wheel body.

4 Claims, 11 Drawing Sheets

(51) Int. Cl.
*B28D 1/22* (2006.01)
*B26D 1/00* (2006.01)

(52) U.S. Cl.
CPC ....... *B26D 2001/0053* (2013.01); *Y02P 40/57* (2015.11); *Y10T 83/0385* (2015.04)

(58) Field of Classification Search
CPC . Y10T 225/321; Y10T 225/307; B28D 1/225; B28D 1/226
See application file for complete search history.

(56) References Cited

U.S. PATENT DOCUMENTS

| | | |
|---|---|---|
| 2009/0235802 A1 | 9/2009 | Ostendrap et al. |
| 2011/0132954 A1 * | 6/2011 | Tomei ................... B28D 1/225 225/2 |

FOREIGN PATENT DOCUMENTS

| | | | |
|---|---|---|---|
| CN | 102557424 A | 7/2012 | |
| JP | WO 2009034759 A1 * | 3/2009 | ........... C03B 33/107 |
| JP | 2010516481 A | 5/2010 | |
| JP | 2010-132542 A1 | 6/2010 | |
| JP | 2010132542 A | 6/2010 | |
| JP | 2012-017223 A1 | 1/2012 | |
| KR | 10-2009-0116749 A1 | 11/2009 | |
| KR | 1020100064964 A | 6/2010 | |
| KR | 10-1081898 B1 | 11/2011 | |
| KR | 10-2011-0085139 A1 | 8/2012 | |
| WO | WO 2008087612 A1 * | 7/2008 | ............. B28D 1/225 |

OTHER PUBLICATIONS

English Translation of JP2010-132542.*
OA Document from JIPO : AppNo-JP2015-524191 (Dated on Mar. 1, 2016).
DA Document from SIPO : AppNo-CN2013-80040032-8 (Dated on Apr. 5, 2016).
9-5-2013-006447539, KR, Office Action, dated Jan. 29, 2013, Young Il Kim.
9-5-2014-023554156, KR, Office Action, dated Apr. 2, 2014, Hyun Il Shin.
PCT/KR/2013/006751, KR, International Search Report, dated Nov. 18, 2013.

* cited by examiner

[Fig. 1a]
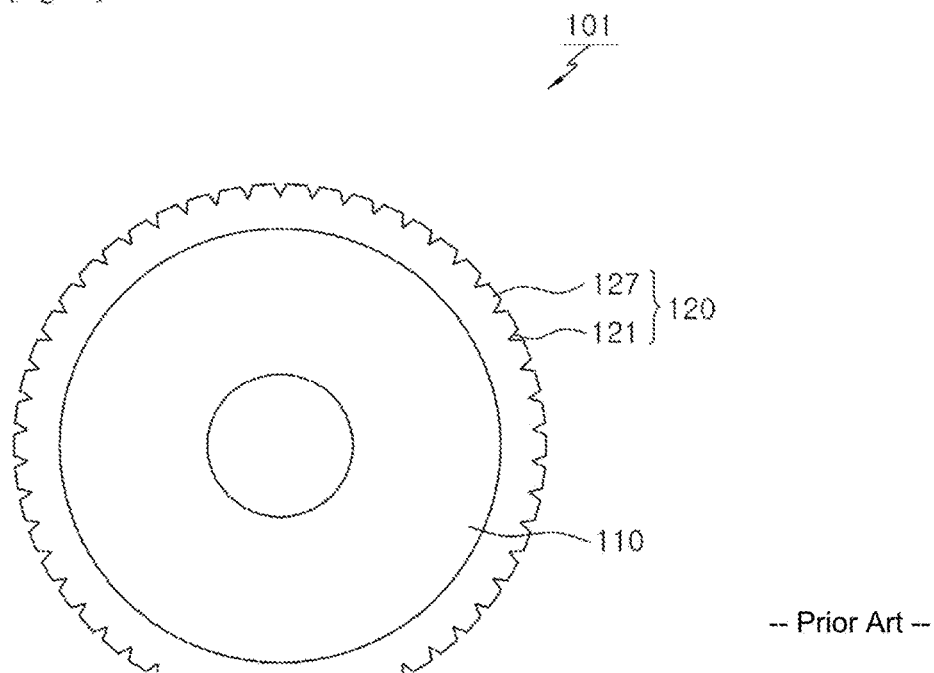
-- Prior Art --
[Fig. 1b]
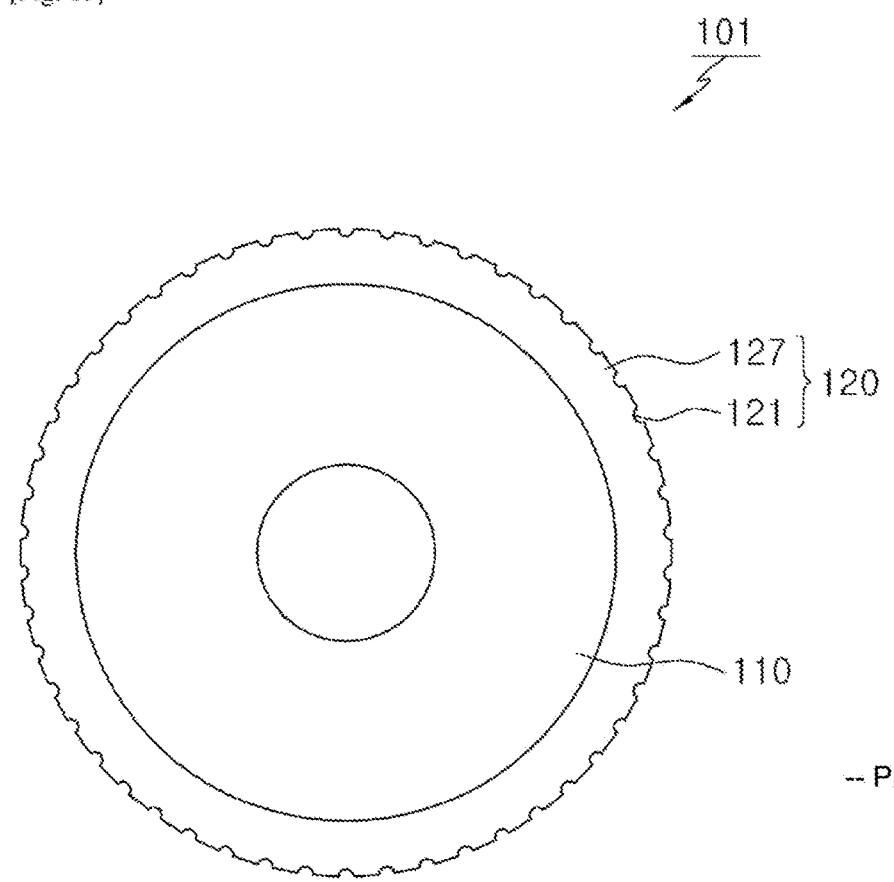
-- Prior Art --

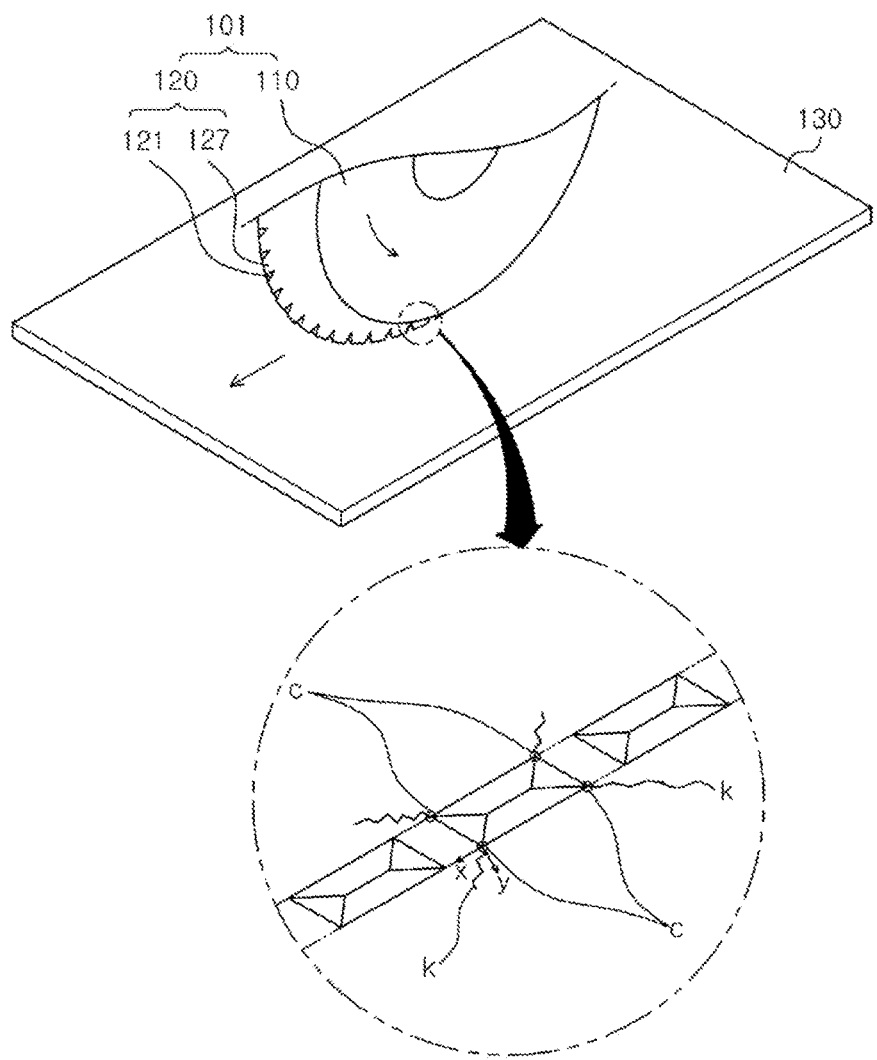
-- Prior Art --

[Fig. 3a]
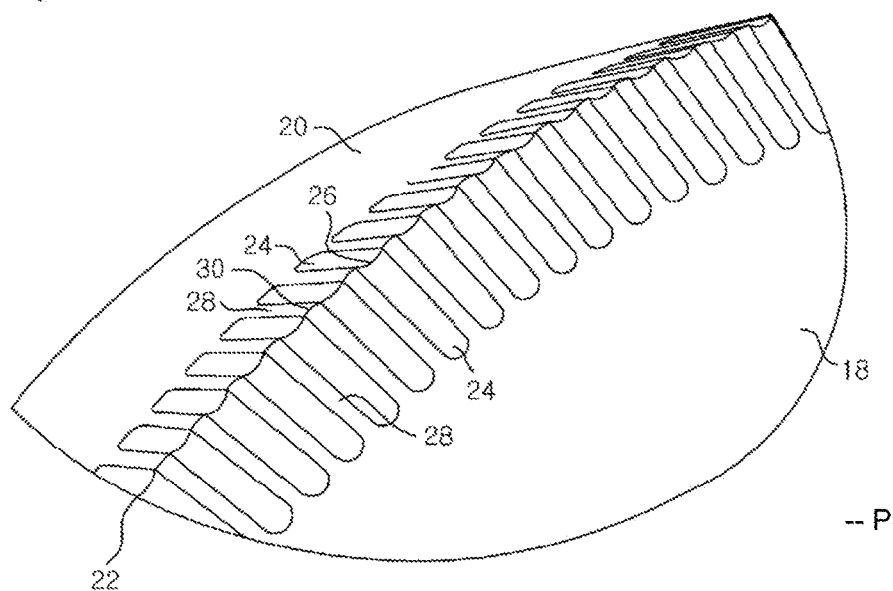
-- Prior Art --
[Fig. 3b]
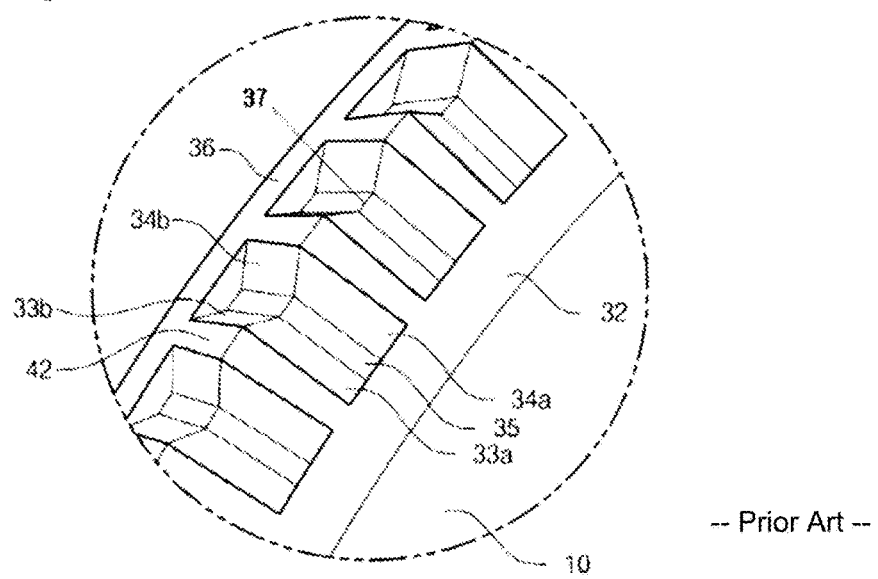
-- Prior Art --

[Fig. 4a]
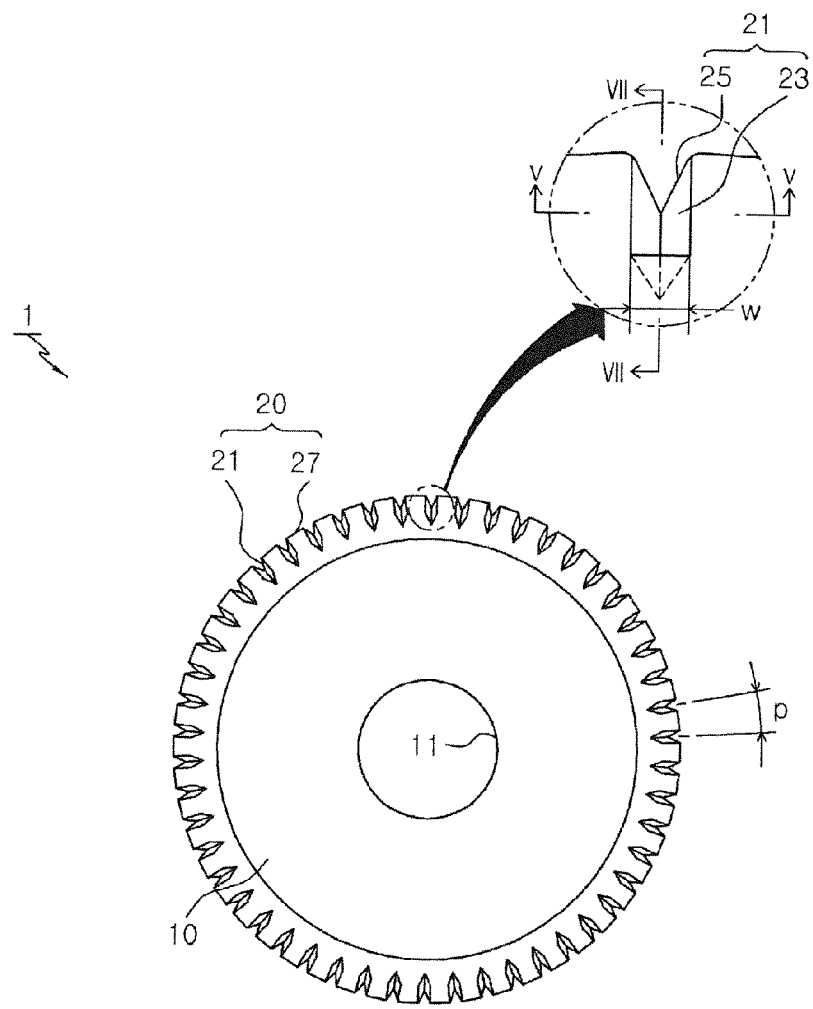
[Fig. 4b]
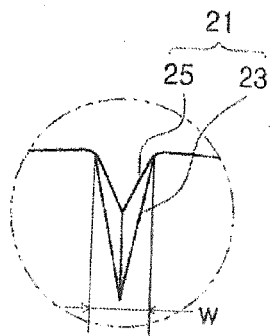

[Fig. 5]
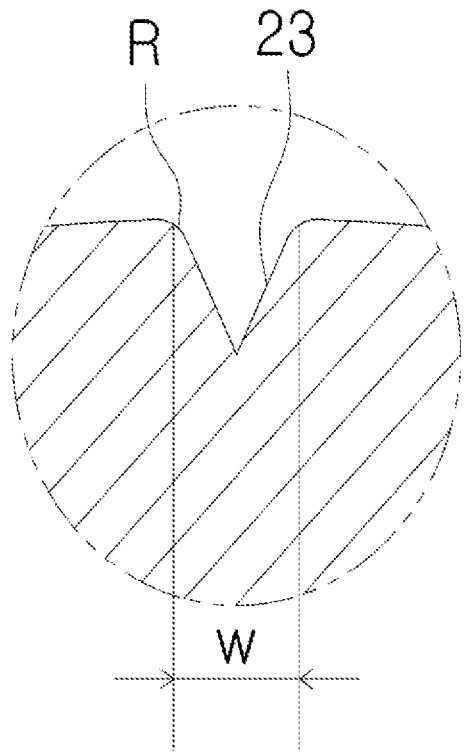
[Fig. 6]
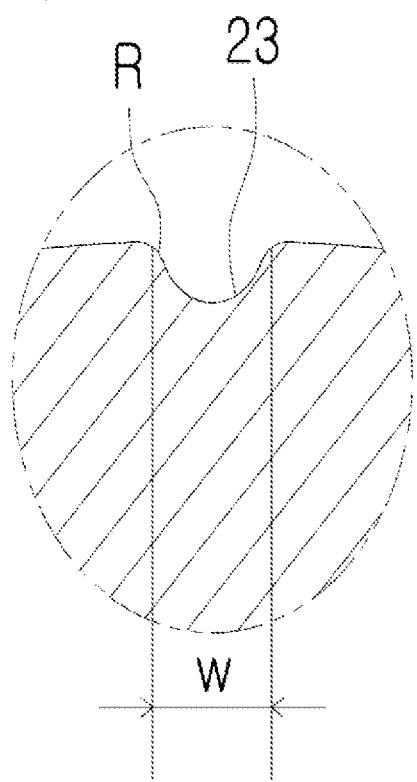

[Fig. 7]
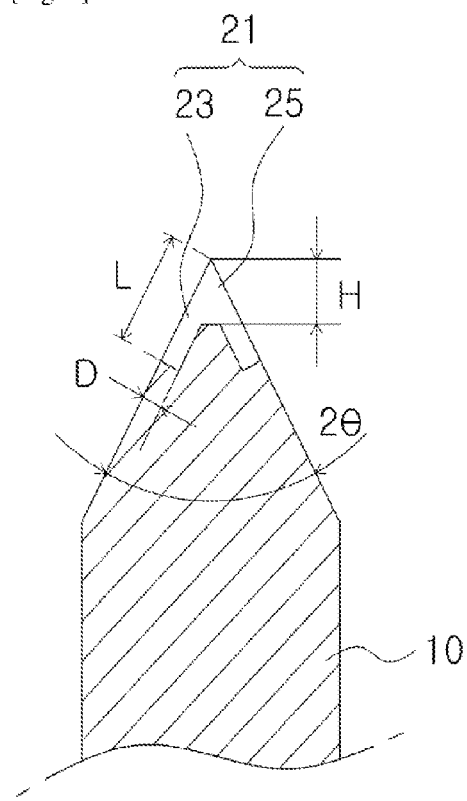
[Fig. 8a]
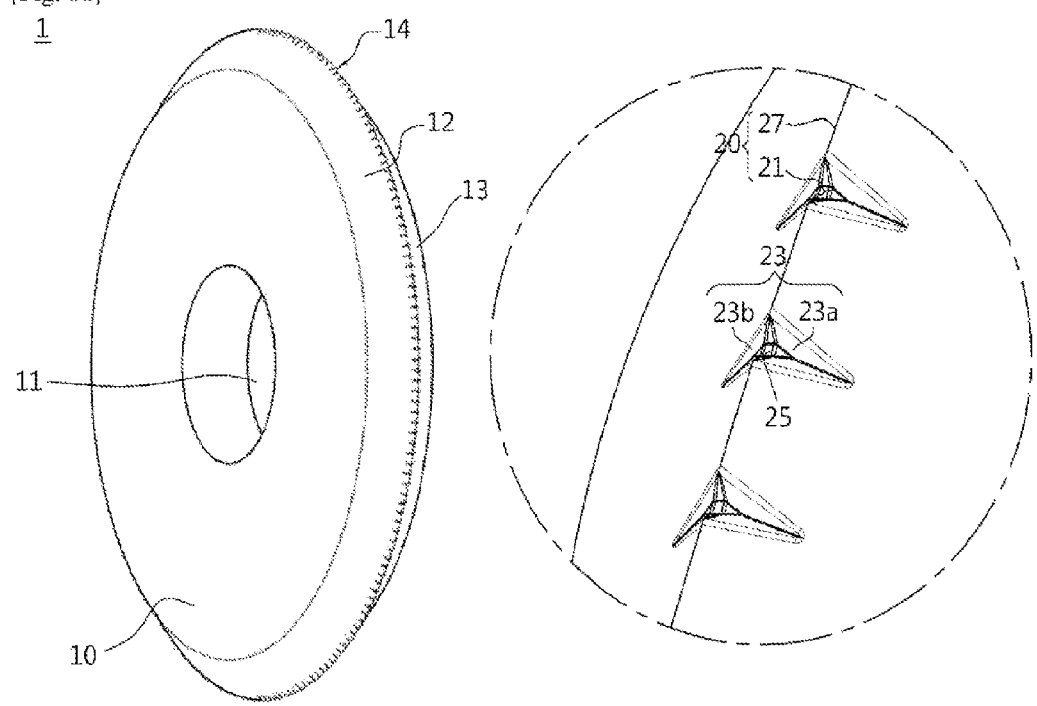

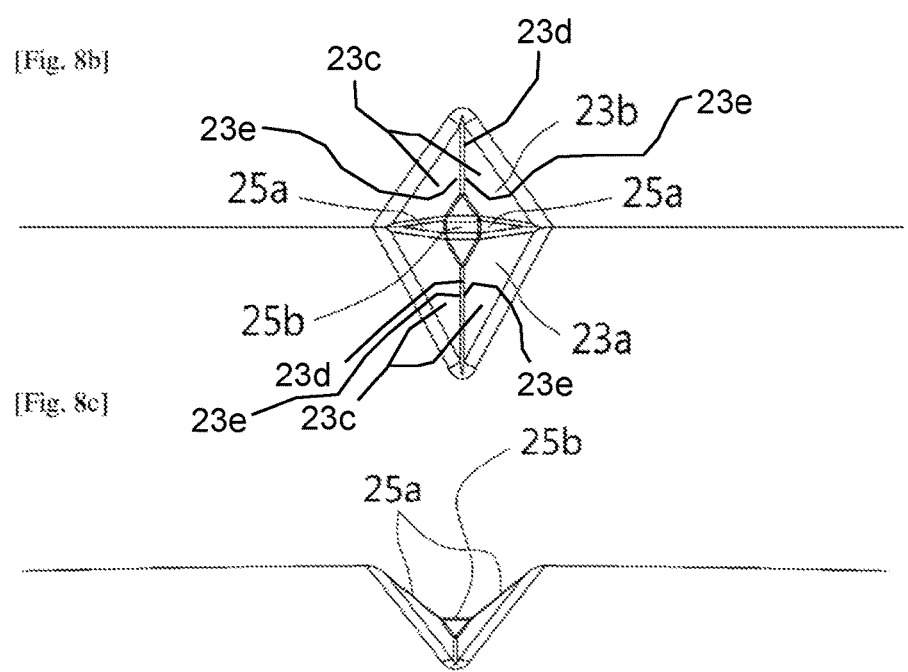

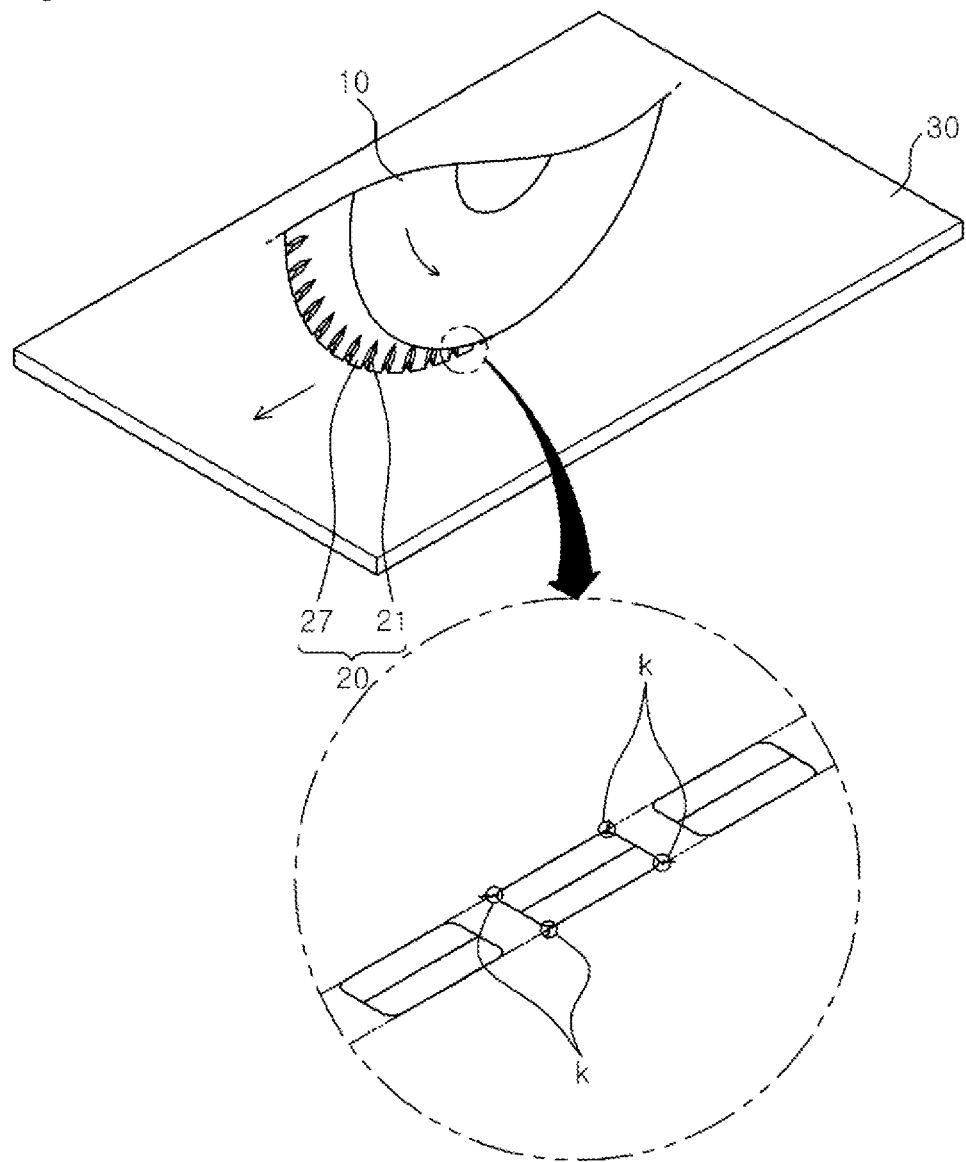
[Fig. 9]

[Fig. 10a]
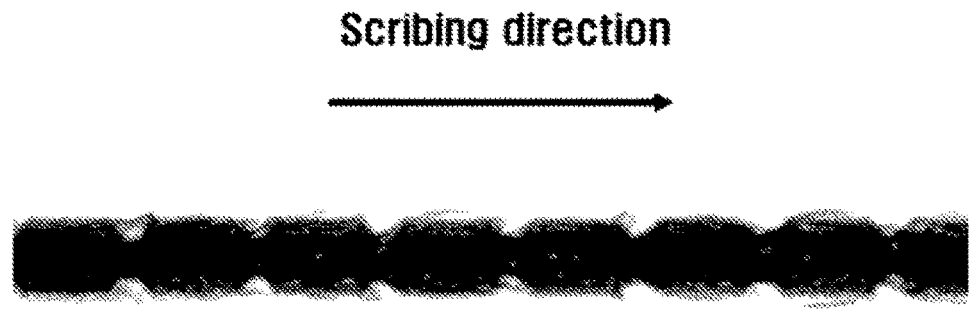
[Fig. 10b]
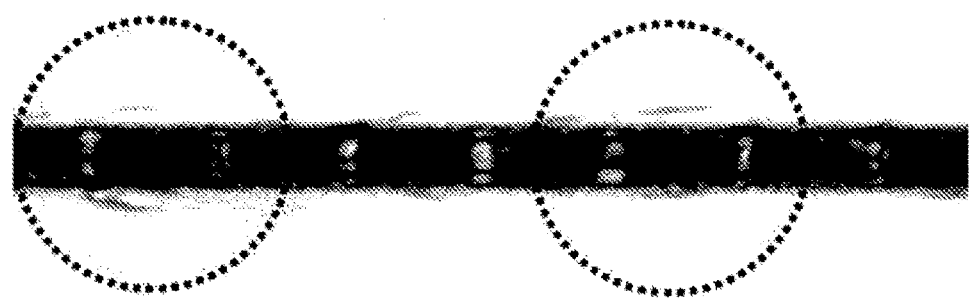

[Fig. 13]
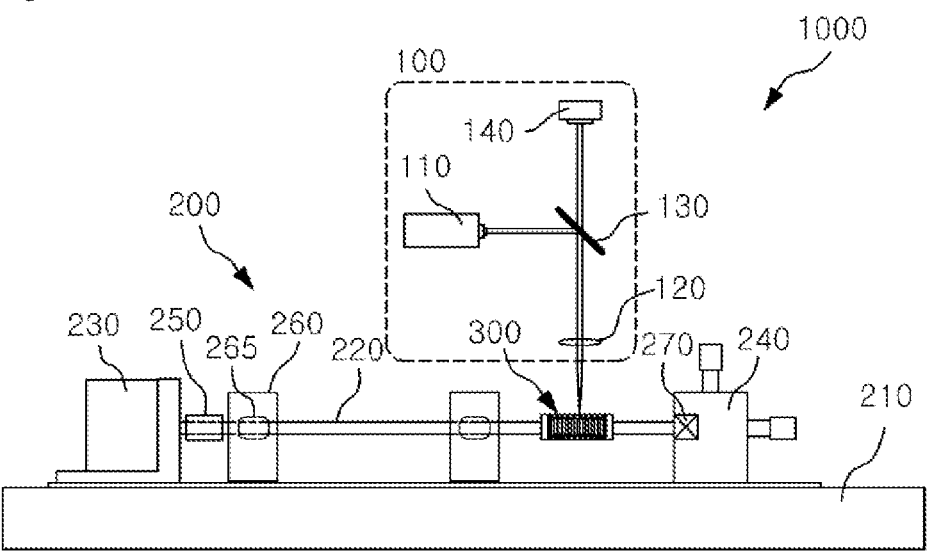
[Fig. 14]
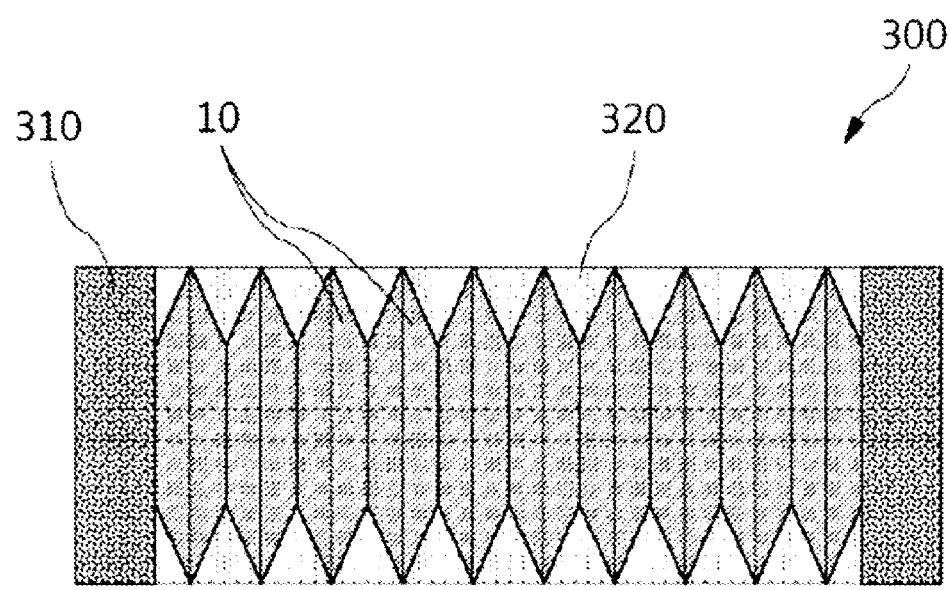

SCRIBING WHEEL HAVING FINE STRUCTURE RECESS

TECHNICAL FIELD

The present invention relates, in general, to scribing wheels and, more particularly, to a scribing wheel having fine structure recesses which are formed along the peripheral edge of the scribing wheel and have an improved structure to be suitable for cutting, for example, a panel for mobile devices which is generally made of a thin glass panel.

BACKGROUND ART

Generally, in producing flat panels such as glass panels for use in an FPD (flat panel display) such as LCDs, touch panels, etc., a process of cutting a large raw material panel into flat panels having a desired size while taking productivity into account is essential. Such a panel cutting process includes a panel scribing process.

The scribing process is typically used in manufacturing a variety of display panels, semiconductor wafers, etc. using flat panels. In detail, the scribing process includes forming a scribing line, corresponding to the size of a flat panel to be produced, on a raw material panel, which is a scribing target to be cut. The target panel on which the scribing line has been formed is cut along the scribing line by applying force to opposite sides of the target panel based on the scribing line.

Typically, flat panels used in display panels, wafers, etc. are made of a brittle material such as glass or the like. Such brittle material is characterized in that when external force is applied thereto, the growth of a crack is very fast. Therefore, the scribing process is very useful in cutting such a brittle material.

Scribing wheels, which are generally used in such a scribing process, include a cutter part which has a plurality of fine recesses and a plurality of cutting blade teeth which are arranged along a peripheral edge of a wheel body. Such a scribing wheel generally has a similar shape to that of a circular saw.

The quality of a scribing process using the scribing wheel is determined depending on the structure of the recesses and the cutting blade teeth of the cutter part formed on the peripheral edge of the scribing wheel. Given this, research and development on the structure of the recesses and the cutting blade teeth of the cutter part are continuously being conducted.

FIGS. 1a and 1b are views showing an example of a conventional scribing wheel. As shown in these drawings, the conventional scribing wheel 101 is configured such that recesses 121 and cutting blade teeth 127 of a cutter part 120 are formed along a peripheral edge portion of a wheel body 110 having a circular shape. Generally, as shown in FIG. 1a, each recess 121 may have a V shape or, as shown in FIG. 1b, each recess 121 may have a U shape.

However, in the conventional scribing wheel, due to the structure of the recesses, when the cutter part cuts into a raw material panel such as a glass panel, which is a scribing target 130, as shown in an enlarged view of FIG. 2, corners C formed between the recesses and the opposite side surfaces of the peripheral edge portion of the wheel body come into contact with the scribing target. Thus, the area of a portion of the scribing target on which stress is concentrated is greatly increased in X- and Y-axial directions, whereby cracks k are caused in directions between the X- and Y-axial directions.

Consequently, cracks are formed in a significant surface area of a flat panel obtained through a scribing process. As a result, the strength, particularly, the bending strength, of the flat panel is markedly reduced.

Furthermore, as stated above, because the area of a portion of the scribing target on which stress is concentrated is greatly increased in X- and Y-axial directions due to the structure of the recesses of the scribing wheel, relatively large cracks are formed in side surfaces of the flat panel produced through the scribing process.

Therefore, the flat panel produced through the scribing process is typically machined through a side surface grinding process to remove cracks that remain in the side surfaces of the flat panel. Taking the side surface grinding process into account, the scribing process must be conducted after an extra area has been ensured on the peripheral side surfaces of the flat panel. However, these cause problems of an increase in material consumption and a reduction in productivity because of addition of the side surface grinding process.

That is, the cutter part including the recesses and the cutting blade teeth is formed along the cutting edge of the scribing wheel. If the recesses formed in the cutter part have a V or U shape in which they are recessed from only the cutting edge of the wheel, large cracks are caused around the vertexes of the cutting blade teeth.

In an effort to over the above-mentioned problems, as shown in FIGS. 3a and 3b, scribing wheels which include a cutter part having recesses each of which has grooves that are radially formed in respective opposite inclined surfaces of a periphery of the scribing wheel and meet at a cutting edge of the scribing wheel were introduced. In such a structure, the grooves formed in the opposite side inclined surfaces make discharge of glass chips easy. Improvement in the shape of a scribing line formed on a panel by the cutting blade teeth enhances the quality of cutting and the quality of edges of the cut panel. However, because the width of each recess ranges from 20 µm to 40 µm and the depth thereof ranges from 6 µm to 12 µm, it is difficult to use such a scribing wheel in cutting a thin panel for mobile devices.

Furthermore, recently, as interest in mobile terminals and tablet PCs, which have relatively large screens, is increased, improvement in the bending strength of display panels of mobile devices has been required to enhance the reliability of products. However, if the above-mentioned conventional scribing wheels are used to manufacture flat panels for use in display panels for mobile terminals and tablet PCs, the bending strength of products cannot be satisfied because of the above-mentioned problems.

Particularly, in manufacturing flat panels for use in display panels for mobile devices, the process of grinding the side surfaces of flat panels after the scribing process is generally omitted in consideration of the problem of the productivity. In this case, it is difficult to satisfy the desired bending strength.

DISCLOSURE

Technical Problem

Accordingly, the present invention has been made keeping in mind the above problems occurring in the prior art, and an object of the present invention is to provide a scribing wheel which is configured such that deterioration in the bending strength of a flat panel obtained through a scribing process can be minimized, whereby the bending strength of the produced flat panel can be improved.

Another object of the present invention is to provide a scribing wheel which can minimize cracks from remaining in the periphery of the flat panel obtained through the scribing process.

A further object of the present invention is to provide a scribing wheel which makes it possible to omit a process of machining side surfaces of the flat panels obtained through the scribing process, thus enhancing productivity.

Yet another object of the present invention is to provide a scribing wheel having a fine recess structure which is configured such that a separate breaking process is not required even under conditions of a low working load, the depth of cut can be precisely adjusted, and the bending strength of the produced flat panel is enhanced, whereby the scribing wheel can be properly used in cutting a thin flat panel for use in portable display devices such as mobile terminals, tablet PCs, etc.

Still another object of the present invention is to provide a scribing wheel which is manufactured in such a way that an ultrafast laser beam is applied to a plurality of wheel bodies so that fine recesses can be precisely and easily formed in the cutter part, whereby the productivity of a scribing wheel manufacturing apparatus can be markedly enhanced.

The objects of the present invention are not limited to the aforementioned objects, and other objects of the present invention will be more clearly understood from the following detailed description by those skilled in this art.

Technical Solution

In order to accomplish the above objects, the present invention provides a scribing wheel having a predetermined thickness and a disk shape, including: a wheel body including an edge part configured in such a way that at least a peripheral edge portion of the wheel body is gradually reduced in thickness from a center to a radial outside so that first and second side surfaces of the peripheral edge portion converge on the edge part; and a cutter part including recesses and cutting blade teeth alternately arranged along the peripheral edge portion, wherein each of the recesses is formed by a combination of first and second side recess portions and an edge recess portion, the first and second side recess portions being respectively formed by recessing portions of the first and second side surfaces converging on the edge part, the edge recess portion being formed by recessing a portion of the edge part.

The first and second side recess portions may be spaced apart from each other to have a predetermined width (W) in such a way that opposite side walls forming the side recess portions have a predetermined angle therebetween such that lower edges of the opposite side walls converge on a center therebetween and form a linear structure.

The first and second side recess portions may be spaced apart from each other to have a predetermined width (W) in such a way that opposite side walls forming the side recess portions have a predetermined angle therebetween such that lower edges of the opposite side walls converge on a center therebetween, wherein the width (W) between the opposite side walls is reduced as a distance from the edge part is increased.

The edge recess portion may include: opposite side surfaces formed by recessing an edge formed by converging both the opposite side walls of the first and second side recess portions and the converged lower edges of the opposite side walls on the edge part; and a bottom surface connecting the opposite side surfaces, whereby the recess has a saddle-shaped structure.

Furthermore, a lower portion of each of the first and second side recess portions may form an inclined surface gently connected to the bottom surface as a distance from the bottom surface is reduced, and form a linear structure as the distance from the bottom surface is increased.

In addition, a depth of each of the first and second side recess portions may be reduced as a distance from the edge recess portion is increased.

The width (W) between the first and second side recess portions on the edge part may range from 1 µm to 10 µm.

Further, a depth (H) of each of the recesses may be the same as that of the edge recess portion and ranges from 0.5 µm to 6 µm.

In addition, a length (L) of each of the recesses may be the same as that of the side recess portions and ranges from 1 µm to 20 µm.

The first and second side surfaces of the peripheral edge portion of the wheel body may form a predetermined angle ($2\theta$) therebetween.

The predetermined angle ($2\theta$) between the first and second side surfaces of the peripheral edge portion of the wheel body may range from 80° to 120°.

Edges formed on the first and second side recess portions and the edge recess portion of the recess may be rounded.

The first and second side recess portions and the edge recess portion of the recess may be simultaneously formed by applying an ultrafast laser beam thereto.

The ultrafast laser beam may have a femtosecond or picosecond pulse width.

Advantageous Effects

A scribing wheel according to the present invention can minimize deterioration in the bending strength of a flat panel obtained through a scribing process.

Furthermore, the scribing wheel according to the present invention can minimize cracks from remaining in the periphery of the flat panel obtained through the scribing process.

In addition, the scribing wheel makes it possible to omit a process of machining side surfaces of the flat panels obtained through the scribing process, thus enhancing the productivity.

The scribing wheel according to the present invention is configured such that a separate breaking process is not required even under conditions of a low working load, the depth of cut can be precisely adjusted, and the bending strength of the produced flat panel is enhanced. Therefore the scribing wheel can be properly used in cutting a thin flat panel for use in portable display devices such as mobile terminals, tablet PCs, etc.

The scribing wheel is manufactured in such a way that an ultrafast laser beam is applied to a plurality of wheel bodies so that fine recesses can be precisely and easily formed in the cutter part, whereby the productivity of a scribing wheel manufacturing apparatus can be markedly enhanced.

The technical effects of the present invention are not limited to the aforementioned objects, and other effects of the present invention will be more clearly understood from the following detailed description by those skilled in this art.

DESCRIPTION OF DRAWINGS

FIGS. 1a and 1b are side views respectively showing conventional scribing wheels;

FIG. 2 is a view illustrating problems of a scribing process using the scribing wheel of FIG. 1a or 1b;

FIGS. 3a and 3b are enlarged views respectively showing the structures of cutter parts of other conventional scribing wheels;

FIG. 4a is a side view of a scribing wheel according to an embodiment of the present invention;

FIG. 4b is a view showing another example of the enlarged portion of FIG. 4a;

FIGS. 5 and 6 are views respectively showing examples of a cross-section of a recess taken along line V-V of FIG. 4a;

FIG. 7 is a view showing a cross-sectional shape of a cutter part taken along line VII-VII of FIG. 4a;

FIG. 8a illustrates a view of a scribing wheel and a partial enlarged view of a cutter part of the scribing wheel according to another embodiment of the present invention; FIG. 8b is a plan view of a recess formed in the scribing wheel of FIG. 8a;

FIG. 8c is a front view of the recess formed in the scribing wheel of FIG. 8a when viewed from a side recess portion;

FIG. 9 is a view illustrating a scribing process using the scribing wheel according to the present invention;

FIGS. 10a and 10b are photograph images comparing a scribing line formed by the scribing wheel according to the present invention with a scribing line formed by the conventional scribing wheel;

FIG. 13 is a schematic view of an apparatus of manufacturing the scribing wheel according to the present invention; and FIG. 14 is a schematic view of a cartridge of the scribing wheel manufacturing apparatus of FIG. 13.

BEST MODE

Figure 11:
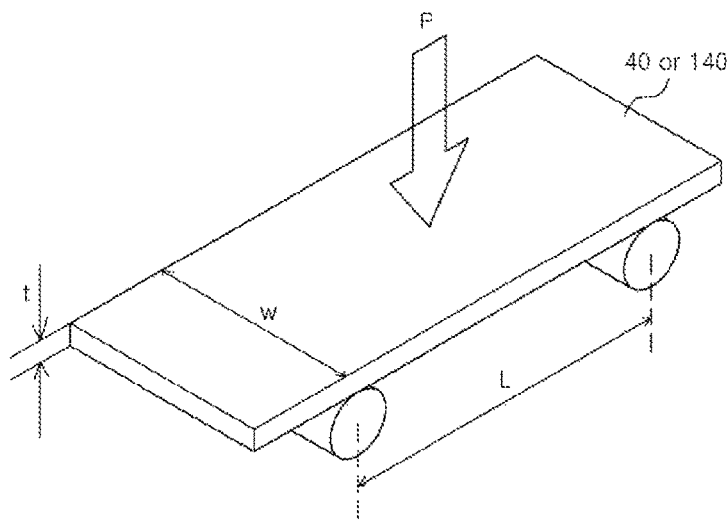
FIG. 11 is a view illustrating a process of testing the bending strength of a flat panel obtained by the scribing wheel according to the present invention or the conventional scribing wheel.

The terminology which is used in common will be used for the purpose of description and not of limitation. Furthermore, terms and words used by the applicant may be used for special cases. In this case, the meaning of terms or words must be understood with due regard to the meaning expressed in the specification rather than taking into account only the basic meaning of the terms and words.

Hereinafter, the technical construction of the present invention will be described in detail with reference to the attached drawings and preferred embodiments.

The present invention is not limited to the following embodiments but can be modified into various forms. Reference should now be made to the drawings, in which the same reference numerals are used throughout the different drawings to designate the same or similar components.

The structure of a cutter part of a scribing wheel used in cutting a panel for TVs or monitors cannot be used in cutting a relatively thin panel for mobile devices such as tablet PCs or cellular phones. The present invention is characterized by providing an improved structure of a cutter part of a scribing wheel which can solve the above-mentioned problem.

That is, unlike the structure of FIGS. 1a and 1b in which each recess is formed by recessing only a portion of a cutting edge of the wheel or the structure of FIGS. 3a and 3b in which grooves radially formed in the opposite inclined surfaces of the perimeter of the scribing wheel meet at the cutting edge, the cutter part according to the present invention is configured in such a way that an edge recess portion formed by recessing a portion of a cutting edge of the wheel is integrally connected to a side recess portion formed by radially recessing portions of opposite inclined side surfaces of the cutter part. Therefore, the scribing wheel according to the present invention can solve the problem of the recess structure of FIGS. 1a and 1b that markedly deteriorates the bending strength of a produced flat panel. In addition, unlike the structure of FIGS. 3a and 3b, the scribing wheel according to the present invention has a fine recess structure in which each of recesses formed in the cutter part is 10 μm or less in width and length. Thus, even under conditions of a low working load, a separate breaking process is not required, and the depth of cut can be precisely adjusted. As a result, occurrence of a crack on edges of a cut glass panel is restricted, whereby the bending strength of the cut panel can be enhanced.

FIGS. 4a through 7 are views illustrating a scribing wheel according to an embodiment of the present invention. FIGS. 8a through 8c are views illustrating a scribing wheel according to another embodiment of the present invention.

The structure of the scribing wheel 1 according to the present invention will be explained in detail with reference to the attached drawings showing embodiments of the structure of the scribing wheel 1 of the present invention.

As shown in FIG. 4a, a scribing wheel 1 according to a first embodiment of the present invention includes a wheel body 10, and a cutter part 20 that is provided around a peripheral edge portion of the wheel body 10 and scribes a scribing target 30.

In this embodiment, the wheel body 10 is a disc-shaped body, including an edge part 14 formed by converging first and second side surfaces 12 and 13 that form the peripheral edge portion of the wheel body 10.

Having a circular wheel shape, the wheel body 10 has in a central portion thereof a shaft coupling hole 11 into which a rotating shaft of a drive unit (not shown) is fitted. In other words, the shaft coupling hole 11 is formed for use in coupling the scribing wheel 1 to the rotating shaft of the drive unit when use of the scribing wheel 1 is needed to scribe the surface of a brittle material (that is, to form a scribing line).

Preferably, the wheel body 10 is made of high-strength cemented carbide or polycrystalline diamond (PCD). Of course, depending on conditions such as the material or thickness of the scribing target 30, the material of the wheel body 10 may be modified into other high-strength materials which are available to laser beam machining or ion beam machining.

The peripheral edge portion of the wheel body 10 is configured, to form the cutter part 20, in such a way that the thickness thereof is gradually reduced from the center to the outer periphery with respect to the radial direction. Preferably, as shown in FIG. 7, the peripheral edge portion of the wheel body 10 has a triangular cross-sectional structure. An angle 2θ is formed between the opposite side surfaces of the peripheral edge portion 14 of the wheel body 10. The angle 2θ is determined, during a process of manufacturing the scribing wheel 1, taking various scribing process conditions including conditions of the scribing target 30 into account. In this embodiment, it is preferable that the angle 2θ ranges from 80° to 120°.

As shown in FIGS. 4a and 4b, the cutter part 20 includes recesses 21 and cutting blade teeth 27 which are alternately arranged along the peripheral edge portion of the wheel body 10.

The pitch p of the recesses 21 and the cutting blade teeth 27 is preferably appropriately determined, during the process of manufacturing the scribing wheel 1, taking various scribing process conditions including conditions of the scribing target 30 into account.

As shown in the enlarged views of FIGS. 4a and 4b, each recess 21 is formed by a combination of a side recess portion 23, including first and second side recess portions, which are respectively formed in the first and second side surfaces 12 and 13 that converge on the edge part 14 of the peripheral edge portion of the wheel body 10, and an edge recess portion 25, which is formed in the edge part 14 of the peripheral edge portion of the wheel body 10.

In detail, the side recess portion 23 is configured in such a way that opposite side surfaces of the first and second side recess portions and lower edges, formed by converging the opposite side surfaces of the respective side recess portions, converge on the edge part 14. Therefore, when viewed from the edge part 14, the side recess portion 23 may have a V-shaped edge structure configured in such a way that the two lower edges that are formed by converging the opposite side surfaces of the first and second side recess portions converge on the edge part 14 and extend from the edge part 14 outwards in opposite directions. The edge recess portion 25 is configured in such a way that side surfaces are formed in the edge part 14 by recessing the V-shaped edge formed in the edge part 14.

The structure of the recess 21 including the side recess portion 23 and the edge recess portion 25 makes a contact surface between the cutter part 20 and the scribing target 30 be formed only in one direction rather than in X- and Y-axial directions when the cutter part 20 comes into contact with the scribing target 30 during a scribing process. This structure minimizes cracks from forming on a scribing line and minimizes deterioration in bending strength of a flat panel obtained through the scribing process, which will be explained later herein.

Here, each recess 21 has a predetermined width W, and the cross-sectional shape thereof may be a polygonal shape, for example, a triangular shape, as shown in FIG. 5. Alternatively, as shown in FIG. 6, the recess 21 may have an arc-shaped cross-section. Preferably, having a predetermined width W, the recess 21 is configured in such a way that the opposite side surfaces of the side recess portion 23 have a predetermined angle therebetween and the width therebetween is reduced from the outer edge towards the center of the wheel so that the lower edges of the opposite side surfaces converge on the center therebetween and form a linear structure. Although it is not shown in the drawings, the lower end of the side recess portion 23 may be parallel to a line connecting the opposite side surfaces of the peripheral edge portion of the wheel body 10 or, alternatively, it may not be parallel thereto.

Particularly, as shown in FIGS. 5 and 6, it is preferable that each of the corners formed between the recess 21 and the opposite side surfaces of the peripheral edge portion of the wheel body 10 be rounded with a predetermined radius R. The radius R of the rounded corner ranges from 0.1 µm to 5 µm. Due to such a rounded corner structure (R), during the scribing process, a stress dispersion effect can be obtained on an area where the corners, formed between the recesses 21 and the opposite side surfaces 12 and 13 of the peripheral edge portion of the wheel body 10, come into contact with the scribing target 30. By virtue of this structure, not only cracks occurring on the scribing line but also deterioration in bending strength of a flat panel obtained through the scribing process can be further minimized.

The width W of the recess 21 is determined during the process of manufacturing the scribing wheel 1 within a range of 10 µm or less depending on various conditions of the scribing process including conditions of the scribing target 30. Preferably, the width W ranges from 1 µm to 6 µm because the scribing wheel according to the present invention must be able to form a fine scribing recess.

Here, as shown in FIG. 4a, the width W of the recess 21 may be constant from the edge recess portion 25 to each distal end of the side recess portion 23. In some cases, for example, in the structure in which the opposite side surfaces of the side recess portion 23 have a predetermined angle therebetween and the width therebetween is reduced from the top to the bottom so that the lower edges thereof converge on the center therebetween, the width W which is the distance between the upper ends of the opposite side surfaces of the side recess portion 23 may be reduced as the distance from the edge part is increased.

The length of the recess 21 is the same as that of the side recess portion 23 and is 20 µm or less. The length of the recess 21, that is, the length of the side recess portion 23, does not affect the scribing operation. Therefore, to enhance the durability of the scribing wheel, it is preferable that the length of the recess 21 be as short as possible, so long as formation of the edge recess portion 25 can be ensured. In this embodiment, the length of the recess 21 ranges from 1 µm to 10 µm.

The depth of the recess 21 is the same as that of the edge recess portion and is 10 µm or less. Preferably, the depth of the recess 21, that is, the depth of the edge recess portion 25, ranges from 0.5 µm to 6 µm.

Hereinafter, a scribing wheel 1 according to a second embodiment of the present invention will be described. As shown in FIG. 8a, the general structure of the scribing wheel 1 according to the second embodiment is almost the same as that of the scribing wheel 1 according to the first embodiment, but only the structure of a recess 21 of a cutter part 20 according to the second embodiment differs from that of the first embodiment. Therefore, the description of the scribing wheel 1 according to the second embodiment will be focused on the structure of the recess 21.

In the same manner as the first embodiment, each of the recesses 21 of the cutter part 20 is formed by a combination of a side recess portion 23, including first and second side recess portions, which are respectively formed in first and second side surfaces 12 and 13 that converge on an edge part 14 of a peripheral edge portion of a wheel body 10, and an edge recess portion 25, which is formed in the edge part 14 of the peripheral edge portion of the wheel body 10.

Particularly, as shown in the enlarged view of FIG. 8a, unlike the first embodiment in which the edge recess portion 25 is formed by only the side surfaces formed by recessing a portion of the edge part 14 from the side recess portion 23, the edge recess portion 25 according to the second embodiment further forms a bottom surface 25b that connects the side surfaces 25a to each other.

The structure of the edge recess portion 25 according to the second embodiment will be explained in detail. As stated above, the side recess portion 23 is configured in such a way that opposite side surfaces 23c of the first and second side recess portions 23a and 23b and lower edges 23e, formed by converging the opposite side surfaces 23c of the respective side recess portions 23a and 23b, converge on the edge part 14. Therefore, when viewed from the edge part 14, the side recess portion 23 may have a V-shaped edge structure configured in such a way that the two lower edges that are formed by converging the opposite side surfaces 23c of the first and second side recess portions converge on the edge part 14 and extend from the edge part 14 outwards in opposite directions. The edge recess portion 25 is configured in such a way that the side surfaces 25a are formed in the edge part 14 by recessing the V-shaped edge formed in the edge part 14 and the bottom surface 25b, connecting the side surfaces 25a to each other, is further formed in the edge part 14. Consequently, the recess 21 generally has a saddle-shaped structure.

As shown in FIG. 8b, the bottom surface 25b is a basin-shaped smooth planar part which is formed in a central portion of the recess 21. Preferably, an obtuse angle is formed between the bottom surface 25b and each side surface 25a. A lower portion of each of the first and second side recess portions 23a and 23b forms an inclined surface, which is gently connected to the bottom surface 25b, as the distance from the bottom surface 25b is reduced, and forms a linear structure 23d as the distance from the bottom surface 25b is increased, so that each of the first and second side recess portions 23a and 23b has a shape of triangle with a corner cut out as shown in FIG. 8b. Furthermore, preferably, all of the edges of the edge recess portion 25 and the side recess portion 23 are rounded to prevent a crack from occurring in a portion of the scribing target 30 being scribed by the cutting edge of the scribing wheel.

By virtue of the saddle-shaped of the recess 21, the scribing wheel according to the present invention does not require a separate breaking process even under low-load conditions and is able to precisely adjust the depth of cut. Furthermore, occurrence of cracks on an edge of a cut glass panel is prevented so that the bending strength of a cut panel is markedly enhanced.

Unlike the conventional scribing wheel in which the cutting blade teeth and the recesses are alternately arranged along the circumferential edge part of the wheel and form a continuous sharp edge, the scribing wheel according to the present invention is configured such that each recess has a saddle-shaped structure, thus having the following excellent effects.

First, because the penetration force is increased by the side recess portions 23 of the recesses 21, the cutting blade teeth more deeply enter a glass panel even under conditions of the same load, thus making it possible to break the glass panel with a relatively small load. Furthermore, by virtue of the side surfaces 25a of the edge recess portion 25 of the recess 21, the cutting edge is rounded rather than being sharp, thus restraining the vertex portions of the edge part from forming a crack in the glass panel when the cutting edge cuts into the glass panel. Consequently, the bending strength of the cut panel can be enhanced. Furthermore, due to the bottom surface 25b of the edge recess portion 25 of the recess 21, the depth of cut can be constant despite variation of pressing force during the panel scribing process, whereby the scribing operation can be precisely conducted.

Meanwhile, the length L and depth D of each side recess portion 23 of the groove 21 according to the first and second embodiments are configured to minimize occurrence of cracks and deterioration of the bending strength of the glass panel form geometrical relationship with the depth H of the edge recess portion, as shown in FIG. 7.

That is, the edge recess portion 25 of the recess 21 has a predetermined depth H from the peripheral edge of the wheel body 10 towards the center of the wheel body 10. Each side recess portion 23 extends a predetermined length L (μm) from the peripheral edge of the wheel body 10 along the inclined surface of the peripheral edge portion.

Here, the length L of the side recess portion 23 of the recess 21 and the depth H of the edge recess portion satisfy the following formula 1.

$$L \geq H/\cos\theta \quad \text{Formula 1}$$

The depth H of the edge recess portion 25 of the recess 21, within a range from 0.5 μm to 6 μm, and the length L of each side recess portion 23, within a range 1 μm to 20 μm, are determined, during a process of manufacturing the scribing wheel 1, taking various scribing process conditions including conditions of the scribing target 30 into account.

Furthermore, the side recess portion 23 of the recess 21 is formed with a depth D (μm) in each of the opposite side surfaces of the peripheral edge portion of the wheel body 10.

The depth D of the side recess portion 23 of the recess 21 and the depth H of the edge recess portion satisfy the following formula 2.

$$D \leq H \times \sin\theta \quad \text{Formula 2}$$

The depth D of the side recess portion 23 of the recess 21 is determined within a range from 0.3 μm to 6 μm, during a process of manufacturing the scribing wheel 1, taking various scribing process conditions including conditions of the scribing target 30 into account.

Hereinafter, the process of scribing a target, using the scribing wheel 1 according to the present invention having the above-mentioned structure and structural conditions, to produce a planar plate (40 of FIG. 11) will be explained.

As shown in FIG. 9, when the scribing wheel 1 comes into contact with the scribing target 30, which is a planar raw material panel, with a predetermined pressure, the cutter part 20 penetrates the planar raw material panel. During this process, due to the structure of the side recess portion of the recess 21, edges formed by the recess 21 and the opposite side surfaces of the peripheral edge portion of the wheel body 10 come into contact with the scribing target 30, and a contact area on which stress is concentrated is formed in only one direction, that is, in an X- or Y-axial direction. Therefore, the direction of a crack k is minimized to one direction, or a crack k is formed in the direction in which the scribing wheel 1 moves. Thereby, a crack is seldom caused on side surfaces of the flat panel 40 obtained through the scribing process.

Particularly, the rounded structure R of the edge formed between the recess 21 and the opposite sides surfaces of the peripheral edge portion of the wheel body 10 disperses stress on the contact area of the scribing target 30, thus minimizing occurrence of a crack.

Thereby, deterioration of the strength, particularly, the bending strength, of the flat panel (40 of FIG. 11) obtained through the scribing process can be minimized.

Furthermore, as stated above, because the present invention can minimize a crack from occurring in the side surfaces of the flat panel obtained through the scribing process, an extra area that must be ensured on the peripheral side surfaces of the flat panel obtained through the scribing process can be minimized. Moreover, an additional machining process such as a side surface machining process for the flat panel can be omitted. Consequently, the productivity can be markedly enhanced.

Ultimately, the flat panel produced through the scribing process using the scribing wheel 1 according to the present invention can reliably satisfy the strength and the bending strength which are required in manufacturing not only a large display panel but also a display panel for mobile terminals, tablet PCs, etc. and a flat panel for use in producing a semiconductor wafer.

Embodiment 1

The scribing wheel 1 having the structure of FIG. 4a was manufactured. In detail, the scribing wheel 1 was manufactured through a process, including: a laser irradiation operation of preparing the wheel body and emitting an ultrafast laser beam onto the edge part of the wheel body to form the recess; a wheel rotating operation of rotating the wheel by a preset angle; and an operation of successively repeating the laser irradiation operation and the wheel rotating operation. Here, PRR (pulse repetition rate, Hz) and a beam size $W_o$ respectively were 100 kHz and 3 μm. A stage speed v was 0.3 m/sec, and an average number of irradiation pulses by laser was 1. Meanwhile, a notch having a depth of 2 μm was formed in the edge part of the wheel by repeating the machining operation forty times at laser fluence in which an ablation depth per pulse is 75 nm.

The pitch of the manufactured scribing wheel 1 was 16.2 μm, the average depth of the notches was 2.17 μm, the length of each notch was 5.2 μm, and the length of a cutting edge was 11.0 μm.

Embodiment 2

The scribing wheel 2 having the structure of FIG. 8a was manufactured by the same method as that used in embodiment 1 under the following manufacturing conditions different from those of embodiment 1.

In detail, PRR (pulse repetition rate, Hz) and a beam size $W_o$ respectively were 50 kHz and 3 μm. A stage speed v was 0.15 m/sec, and an average number of irradiation pulses of laser was 1. A notch having a depth of 2 μm was formed in the edge part of the wheel by repeating the machining operation sixty times at laser fluence in which an ablation depth per pulse is 50 nm.

The pitch of the manufactured scribing wheel 2 was 16.2 μm, the average depth of the notches was 2.25 μm, the length of each notch was 5.0 μm, and the length of a cutting edge was 11.2 μm.

COMPARATIVE EXAMPLE

A scribing wheel according to a comparative example having the same structure as that of FIG. 1a was prepared. The pitch of the scribing wheel according to this comparative example was 16.5 μm, the average depth of a notch was 2.8 μm, the length of the notch was 9.5 μm, and the length of a cutting edge was 7.0 μm.

Experimental Example 1

A scribing line A formed on the scribing target 30 through the scribing process using the scribing wheel 1 according to embodiment 1 and a scribing line B formed on the scribing target 30 through the scribing process using the scribing wheel of the comparative example, which is the conventional scribing wheel, were observed through a microscope, and the microscope images were respectively shown in FIGS. 10a and 10b.

As shown in the test result image of FIG. 10a, it can be understood that occurrence of cracks on the scribing line formed by the scribing wheel 1 according to the present invention is markedly mitigated compared to that of the scribing line of FIG. 10b formed by the scribing wheel according to the comparative example.

Experimental Example 2

Processes of scribing organic panels of 250 μm using the scribing wheels 1 manufactured according to embodiments 1 and 2 and the scribing wheel according to the comparative example were conducted, and scribing depths depending on working loads were measured. The measurement results are shown in Table 1.

TABLE 1

| Classification | Working load (N) | Scribing depth (μm) |
| --- | --- | --- |
| Scribing wheel 1 | 8.0 | 229 |
| Scribing wheel 2 | 8.5 | 223 |
| Scribing wheel of comparative example | 9.5 | 214 |

As shown in Table 1, it can be appreciated that, in terms of the scribing depth, despite being given a lower working load, the scribing wheel 1 or 2 according to the present invention is superior to the scribing wheel of the comparative example. In addition, according to the present invention, it was possible to break the glass panel even with a relatively low working load ranging from 8 N to 8.5 N.

Experimental Example 3

The bending strength of the flat panels 40, having a thickness of 500 μm, obtained by the scribing wheels 1 and 2 according to the present invention, and the bending strength of the flat panel 140 obtained by the scribing wheel of the comparative example were measured by a method of FIG. 11. The results are shown in Table 2.

Conditions of a bending strength test are as follows.

A)
Test method: 3-point bending test
B)
Loading speed: 12.5 ram/min
C)
Sample size: length 30× width 10× thickness 0.5 (mm³)
D)
The number of test samples: 100
E)
Bending strength calculation formula: $\sigma_f = 3PL/2Wt^2$
{$\sigma_f$: bending strength, P: maximum load when sample is broken, L: distance between sample supports, W: width of sample (10 mm), t: thickness of sample (0.5 mm)}

TABLE 2

| Classification | Working load (N) | Bending strength (Mpa) |
| --- | --- | --- |
| Scribing wheel 1 | 8.0 | 353 |
| Scribing wheel 2 | 8.5 | 389 |
| Scribing wheel of comparative example | 9.5 | 316 |

It can be understood from Table 2 that, in terms of the bending strength, the scribing wheels 1 and 2 according to the present invention are superior compared to the scribing wheel of the comparative example.

Particularly, the scribing wheel 2 is configured in such a way that the edge recess portion 25 has the side surfaces and the bottom surface so that the recess generally has a saddle-shaped structure. It can be understood that the bending strength of the glass panel obtained by the scribing wheel 2 having the above configuration is further superior compared to that of the glass panel obtained by the scribing wheel 1 configured in such a way that the edge recess portion 25 has only the side surfaces. The reason for enhancement of the bending strength is because the recess structure of the scribing wheel 2 makes it possible to maintain the depth of cut constant despite variation of pressing force during the scribing process and thus precisely cut the glass panel, whereby dispersion of the bending strength is markedly reduced.

The bending strength of the flat panels 40, having a thickness of 500 μm, obtained by the scribing wheels 1 and 2 according to the present invention, and the bending strength of the flat panel 140 obtained by the scribing wheel of the comparative example were measured by the method of FIG. 11. The results are shown in Table 2.

Experimental Example 4

To compare the lifetime of the scribing wheels 1 and 2 manufactured by embodiments 1 and 2 with that of the scribing wheel of the comparative example, each scribing wheel scribed glass panels having a thickness of 0.5 mm until the scribing distance that the scribing wheel has scribed the glass panels was 1.8 km, and then the bending strength of the glass panels, obtained after the scribing wheel has scribed 0.6 km, 1.2 km and 1.8 km, was measured. The results are shown in FIG. 12.

Figure 12:
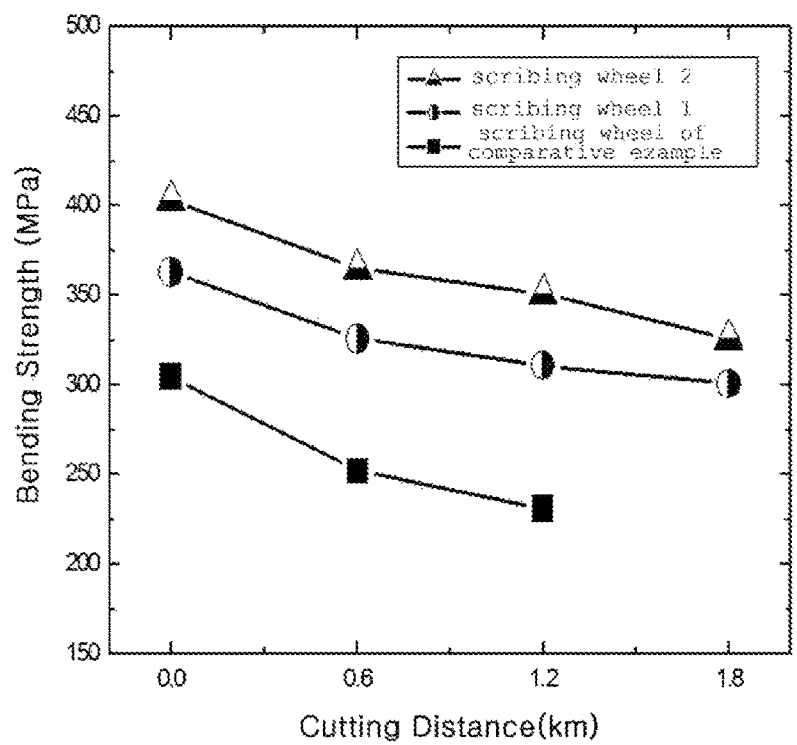
FIG. 12 is a graph showing the results of the bending strength tests of the flat panels obtained by the scribing wheel according to the present invention and the conventional scribing wheel.

As shown in FIG. 12, in the scribing wheel 1 or 2 according to the present invention, the bending strength was maintained almost constant regardless of an increase of the scribing distance, compared to the scribing wheel of the comparative example in which the bending strength was sharply reduced as the scribing distance increased. Therefore, it can be understood that the lifetime of the scribing wheels 1 and 2 according to the present invention is improved compared to the scribing wheel of the comparative example.

The above test results prove the effects which can be obtained by the structural characteristics of the scribing wheel according to the present invention. Furthermore, the test results prove that the scribing wheel according to the present invention can minimize deterioration in the bending strength of a flat panel obtained through the scribing process.

In addition, the test results prove that occurrence of cracks on the periphery of the flat panel obtained through the scribing process can be minimized.

Therefore, the flat panel produced by the scribing wheel according to the present invention makes it possible to omit a separate side surface machining process, whereby the productivity can be enhanced.

Moreover, the present invention can manufacture a flat panel that can satisfy the bending strength required in portable display devices such as mobile terminals, tablet PCs, etc.

Hereinafter, an apparatus and method for manufacturing the scribing wheel 1 according to the present invention having the above-mentioned structure and effects will be described in detail.

The scribing wheel manufacturing apparatus 1000 basically includes a laser irradiation unit 100 and a wheel moving unit 200. The laser irradiation unit 100 emits an ultrafast laser beam. The wheel moving unit 200 horizontally or vertically moves or rotates the wheel body 10 so that the edge part 14 of the wheel body 10 can be located on a light path of the laser beam emitted from the laser irradiation unit 100. Fine notches, that is, recesses 21, are formed in the edge part 14 of the wheel body 10 by the laser beam emitted from the laser irradiation unit 100.

As shown in FIG. 13, the laser irradiation unit 100 includes a laser source 110, an object lens 120, a dichroic mirror 130 and an image capturing unit 140.

Preferably, the laser source 110 is an ultrafast laser, which can minimize thermal deformation, so as to embody a non-contact and nonthermal process. Particularly, to form recesses having a fine structure in the scribing wheel 1 of the present invention, it is preferable that the laser irradiation unit 100 be configured to emit a laser beam having a femtosecond or picosecond pulse width.

The object lens 120 functions to focus a laser beam emitted from the laser source 110 onto the edge part 14 of the wheel body 10.

The dichroic mirror 130 is disposed on a light path between the laser source 110 and the object lens 120. The dichroic mirror 130 total-reflects light within a wavelength range of a laser beam emitted from the laser source 110 and transmits light within the other wavelength range. Any optical element (even if it is not a dichroic mirror) can be used as a device conducting the function of the dichroic mirror 130, so long as it can conduct the above-mentioned function.

Using light transmitting through the dichroic mirror 130, the image capturing unit 140 captures an image of the edge part 14 of the wheel body 10. As an element having such a function, the CCD (charge coupled devices) cameras are widely used. Given this, the image capturing unit 140 may comprise a CCD camera or the like.

The wheel moving unit 200 includes a stage 210, a rotating shaft 220, a step motor 230 and a transfer unit 240. The stage 210 is a worktable to provide space in which the wheel body 10 is placed and a notch forming process is conducted. The stage 210 is configured so as to be horizontally movable. The rotating shaft 220 is inserted into the shaft coupling hole 11 of the wheel body 10. The step motor 230 and the transfer unit 240 are respectively coupled to the opposite ends of the rotating shaft 220. A portion onto which a laser beam is irradiated can be adjusted by horizontally or vertically moving or rotating the rotating shaft 220 with the wheel body 10 fitted over the rotating shaft 220. In this way, a notch, that is, a recess 21, having a predetermined size can be formed at a predetermined position in the edge part 14 of the wheel body 10 through a laser machining process.

The step motor 230 governs the rotation of the wheel body 10. In detail, placed on the stage 210 and disposed at one end of the rotating shaft 220, the step motor 230 rotates the rotating shaft 220 to rotate the wheel body 10. Preferably, the wheel moving unit 200 further includes a coupler 250 which is provided on a connection part formed between the step motor 230 and the rotating shaft 220. The coupler 250 functions to remove transmission of noise movement including axial precession of the output shaft of the step motor 230.

The transfer unit 240 functions to horizontally or vertically move the wheel body 10. In detail, the transfer unit 240 is coupled to the stage 210 and disposed at the other end of the rotating shaft 220 so as to horizontally or vertically move the wheel body 10. The transfer unit 240 is used in aligning the wheel body 10 to a desired position not only before the notch forming process begins but also during the notch forming process. Particularly, the transfer unit 240 is used to control the vertical position of the wheel body 10 and thus adjust the depth of the recess 21 formed by a laser beam applied. To precisely control the movement of the wheel body 10, the wheel moving unit 200 is preferably configured such that an image captured by the image capturing unit 140 or a height value measured by a separate height sensor 270 is used in vertically moving the wheel body 10.

Particularly, the present invention is largely characterized in that recesses 21 are formed, through a single recess forming process, in a plurality of wheel bodies 10 at the same time rather than in each wheel body 10 one by one. That is, the apparatus 100 for manufacturing the scribing wheel 1 having fine-structure recesses is configured such that a plurality of wheel bodies 10 are coaxially arranged and placed on top of one another to form a stack of wheel bodies, and recesses 21 are formed in the stack. To stably hold a plurality of wheel bodies 10, the present invention uses the structure of a wheel cartridge 300. This will be explained in detail as follows.

FIG. 14 is a schematic view of a wheel cartridge according to the present invention. The wheel cartridge 300 includes a wheel stack formed of a plurality of wheel bodies 10 coaxially arranged and placed on top of one another, a pair of support plates 310 provided on respective opposite ends of the wheel stack, and a filler 320 charged into space between the wheel bodies 10. A single wheel body 10 may be disposed in the wheel cartridge 300 or, alternatively, several tens or hundreds of wheel bodies 10 may be disposed in the wheel cartridge 300. Recesses 21 are formed at the same time in the wheel bodies 10, placed on top of one another, by the laser irradiation unit 100. Thereby, the productivity can be markedly enhanced compared to forming recesses 21 in only a single wheel body at a time.

The support plates 310 may have any shape so long as they can maintain the shape of the wheel stack without making the wheel bodies 10 be spaced apart from each other. The support plates 310 may also be made of any material as well as glass. The space between the wheel bodies 10 are filled with the filler 320. The filler 320 is made of material (polymer material) which is soluble to a solvent (water, etc.) which does not physically or chemically damage the wheel body 10. The filler 320 enhances adhesive strength between the wheel bodies 10 and between the wheel bodies 10 and the support plate 310. The filler 320 also functions to prevent the surface of a portion of the wheel other than target portions to be machined from being damaged by plume or the like caused by a laser beam when forming recesses using the ultrafast laser. Preferably, the filler 320, made of polymer material or the like, is be configured such that the thickness thereof on the edge part 14 of the wheel body 10 is several tens of nanometers or less so as to prevent the precision of the process of forming recesses in the edge part using the ultrafast laser from being affected by the filler 320.

As such, charged into space between the outer edges of the wheel bodies 10 or applied thereto, the filler 320 can prevent partial ablation from being caused on a portion of the wheel body 10 other than the edge part 14 during the laser machining process. Alternatively, the degree of ablation may be controlled by varying the degree, with which the filler is applied to the wheel body 10, so that the three-dimensional structure of the recess 21 formed in the edge part 14 can be artificially controlled.

The method of manufacturing the scribing wheel 1 using the scribing wheel manufacturing apparatus 100 of the present invention having the above-mentioned construction will be explained below.

First, the wheel body 10 is disposed such that it is perpendicular to a horizontal plane (that is, an XY plane) and simultaneously the opposite surfaces of the wheel body 10 are perpendicular to the direction of the drive axis of the processing operation. Preferably, the axial direction of the wheel body 10 is parallel to either the X-axis or the Y-axis. When the wheel cartridge 300 is used, it is disposed such that the wheel bodies 10 are oriented in the same manner.

Such alignment and arrangement operation may be manually conducted, or it may be automatically conducted using an image obtained from the image capturing unit 240.

After the wheel body 10 or the wheel cartridge 300 is placed at the correct position on the worktable, that is, on the stage 210, the height of the object lens 120 is adjusted or the height of the wheel body 10 is adjusted by the transfer unit 240 such that the laser beam emitted from the laser irradiation unit 100 is focused on the edge part 14 of the wheel body 10.

To conduct this focus alignment operation, an image obtained by the image capturing unit 240 may also be used or, alternatively, a height value measured by a height sensor 270 separately provided in the wheel moving unit 200 may be used.

After the operation of aligning and arranging the wheel body 10 or the wheel cartridge 300 in a three-dimensional (XYZ) space has been completed, a recess 21 is formed in the edge part 14 of the wheel body 10 by focusing an ultrafast laser beam emitted from the laser irradiation unit 100 on the edge part 14. Here, the first and second side recess portions 23*a* and 23*b* and the edge recess portion 25 of the recess 21 are formed at the same time by applying an ultrafast laser beam having a femtosecond or picosecond pulse width. Particularly, depending on the width, depth, saddle-shaped structure of the recess 21 and characteristics of the wheel body 10, the energy of a laser beam, PRR of the laser, a relative movement speed of the laser and the number of repetition of irradiation are determined.

One recess 21 can be formed in the edge part 14 of the wheel body 10 through the above-mentioned process. After the recess 21 has been formed, the wheel body 10 is rotated by a predetermined angle, and the recess forming process is repeated. During such a process, a plurality of recesses 21, which are circumferentially arranged, are formed in the wheel body 10.

As described above, in the present invention, because the wheel cartridge 300 is used, recesses 21 can be formed in even several hundreds of wheel bodies 10 at the same time rather than in each wheel body 10 one by one. Therefore, the effect of enhancing the productivity of the scribing wheel manufacturing apparatus can be maximized.

The invention claimed is:

1. A scribing wheel having a predetermined thickness and a disk shape,
   comprising:
   a wheel body including a peripheral edge portion which is gradually reduced in thickness in a radially direction from a center portion to the peripheral edge portion so that first and second side surfaces (12,13) of the peripheral edge portion converge forming an edge part (14); and
   a cutter part including recesses and cutting blade teeth alternately arranged along the peripheral edge portion, wherein each of the recesses includes a combination of first and second side recess portions (23*a,b*) and an edge recess portion (25), the first and second side recess portions (23*a,b*) are provided in the first and second side surfaces (12, 13) and converge on the edge part, the edge recess portion (25) is provided in the edge part of the peripheral edge portion of the wheel body, wherein the edge recess portion (25) includes a combination of opposite side surfaces (25a) and a bottom surface (25b) connecting the opposite side surfaces, the opposite side surfaces are formed by recessing the edge part and the bottom surface is formed by recessing a lower edge part, the opposite side surfaces and the bottom surface are disposed between the first and second side recess portions (23a,b), and the recess has a saddle-shaped structure, and wherein a width between upper ends of the opposite side surfaces of the first and second side recess portions decreases as a distance from the edge part toward the center portion is increased, wherein a depth of each of the first and second side recess portions decreases as a distance from the edge part toward the center portion is increased.

2. The scribing wheel of claim 1, wherein edges on the first and second side recess portions and the edge recess portion of the recess are rounded.

3. The scribing wheel of claim 2, wherein the first and second side recess portions and the edge recess portion of the recess are configured to be simultaneously formed by applying an ultrafast laser beam thereto.

4. The scribing wheel of claim 1, wherein the first and second side recess portions and the edge recess portion of the recess are configured to be simultaneously formed by applying an ultrafast laser beam thereto.

* * * * *